US012769891B2

(12) United States Patent
Ting et al.

(10) Patent No.: US 12,769,891 B2
(45) Date of Patent: Oct. 20, 2026

(54) CABLE-LOCK UNIT PRESENCE IN COMPUTING SYSTEMS

(71) Applicant: Hewlett-Packard Development Company, L.P., Spring, TX (US)

(72) Inventors: Chia-Wei Ting, Taipei City (TW); Yow Wei Cheng, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 512 days.

(21) Appl. No.: 17/419,423

(22) PCT Filed: Feb. 22, 2019

(86) PCT No.: PCT/US2019/019271
§ 371 (c)(1),
(2) Date: Jun. 29, 2021

(87) PCT Pub. No.: WO2020/171827
PCT Pub. Date: Aug. 27, 2020

(65) Prior Publication Data
US 2022/0058297 A1 Feb. 24, 2022

(51) Int. Cl.
*H04L 29/00* (2006.01)
*E05B 73/00* (2006.01)
*G06F 21/10* (2013.01)
*G06F 21/57* (2013.01)
*G06F 21/86* (2013.01)

(52) U.S. Cl.
CPC .......... *G06F 21/86* (2013.01); *E05B 73/0005* (2013.01); *E05B 73/0082* (2013.01); *G06F 21/10* (2013.01); *G06F 21/575* (2013.01); *E05B 2073/0088* (2013.01); *G06F 2212/1052* (2013.01)

(58) Field of Classification Search
CPC .. G06F 21/86; G06F 21/10; G06F 2212/1052; E05B 73/0005
USPC .......................................................... 726/34
See application file for complete search history.

(56) References Cited

U.S. PATENT DOCUMENTS 6,756,704 B2 6/2004 Milojicic et al.
7,696,857 B2 * 4/2010 Kritt .................... G07F 7/0886 340/5.31
9,349,266 B2 * 5/2016 Stoddard ............ G08B 13/1445
9,567,776 B2 2/2017 Moock et al.
(Continued)

FOREIGN PATENT DOCUMENTS

CN 103276955 A 9/2013

*Primary Examiner* — Jeffrey C Pwu
*Assistant Examiner* — Michael D Anderson
(74) *Attorney, Agent, or Firm* — Quarles & Brady LLP

(57) ABSTRACT

Examples of a computing system having a lock port for a cable-lock unit are described. In an example, a computing system includes a control unit, a receptacle electrically coupled to the control unit, a lock port to receive a cable-lock unit to lock the computing system at a location, a lock engagement member, and a plug coupled to the lock engagement member. The lock engagement member and the plug are to translate and form an electrical connection between the plug and the receptacle in response to receiving the cable-lock unit in the lock port. The control unit is to determine presence of the cable-lock unit in the lock port in response to formation of the electrical connection between the plug and the receptacle.

18 Claims, 6 Drawing Sheets

(56) References Cited

U.S. PATENT DOCUMENTS

| | | | |
|---|---|---|---|
| 2004/0074264 | A1 | 4/2004 | Kung et al. |
| 2006/0066438 | A1 | 3/2006 | Altounian et al. |
| 2007/0144225 | A1 | 6/2007 | Tamura |
| 2008/0001705 | A1 | 1/2008 | Kritt et al. |
| 2010/0147041 | A1 | 6/2010 | Teicher et al. |
| 2011/0007475 | A1 | 1/2011 | Escamilla et al. |
| 2012/0226910 | A1 | 9/2012 | Hutzler et al. |
| 2015/0278556 | A1 | 10/2015 | Avni et al. |
| 2016/0090757 | A1 | 3/2016 | Aisaka |
| 2016/0275315 | A1 | 9/2016 | Chu et al. |
| 2017/0337788 | A1 | 11/2017 | Wu et al. |
| 2018/0285285 | A1* | 10/2018 | Carnevale ........... G06F 12/1466 |
| 2020/0149316 | A1* | 5/2020 | Parker ................ G08B 13/1445 |

* cited by examiner

CABLE-LOCK UNIT PRESENCE IN COMPUTING SYSTEMS

BACKGROUND

Computing systems like laptops, tablets, and mobile phones, for example, at kiosks, offices, etc., may be physically secured or locked to a rigid surface using a cable-lock unit. The cable-lock unit, such as a Kensington-type lock, coupled to computing systems may prevent theft of the computing systems.

BRIEF DESCRIPTION OF DRAWINGS

The following detailed description references the drawings, wherein.

DETAILED DESCRIPTION

Figure 1:
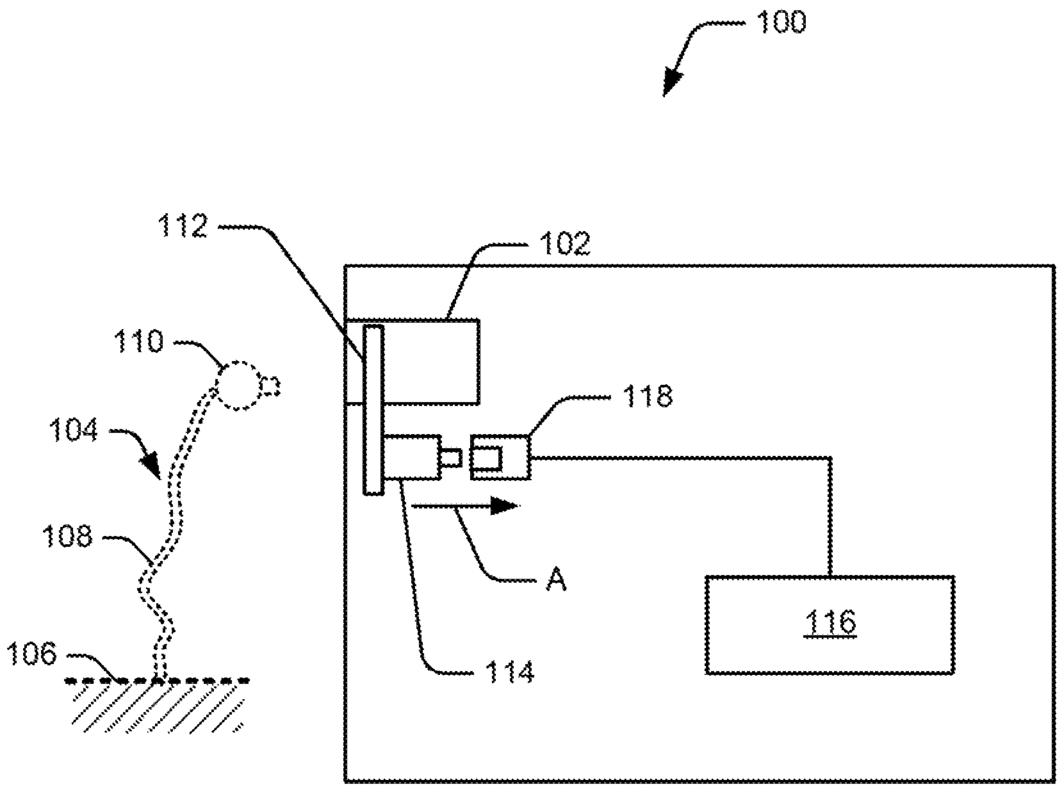
FIG. 1 illustrates a computing system, according to an example.

Computing systems may include a lock port into which a cable-lock unit, such as a Kensington-type lock, can be inserted to physically lock the computing systems. The computing systems may include laptops, tablets, mobile phones, etc. The lock port of the computing system may be a physical port to which one end of the cable-lock unit is secured. The other end of the cable-lock unit is attached to a rigid immovable surface such that, when secured to the computing system, the cable-lock unit tethers or locks the computing system to the rigid immovable surface. The cable-lock unit coupled to the computing systems protect or prevent the computing systems from being stolen.

While a physically locked computing system, locked using a cable-lock unit, may not be stolen, an unauthorized user or a user with a mala fide intention may still be able to access the computing system which may compromise the security of the computing system. An unauthorized user may access the computing system for an illicit activity or for accessing or stealing data.

The present subject matter describes computing systems with a lock port for a cable-lock unit, such as, a Kensington-type lock. The lock port may receive the cable-lock unit to lock the computing system at a location. In an example, a computing system of the present subject matter may include a control unit and a receptacle electrically coupled to the control unit. The computing system may also include a lock engagement member and a plug coupled to the lock engagement member. The lock engagement member and the plug of the computing system may translate and form an electrical connection between the plug and the receptacle in response to receiving the cable-lock unit in the lock port, and the control unit of the computing system may determine presence of the cable-lock unit in the lock port in response to formation of the electrical connection between the plug and the receptacle. Further, the control unit of the computing system may operate the computing system in a first mode in response determining the presence of the cable-lock unit in the lock port. In an example, the first mode may be a secure mode, a demo mode, a guest user mode, or such, in which the computing system may work in a restricted environment such that no user can use the computing system for an illicit activity or for accessing or stealing data.

The lock engagement member and the plug may translate and break the electrical connection between the plug and the receptacle in response to removing the cable-lock unit from the lock port, and the control unit may determine absence of the cable-lock unit in the lock port in response to break in the electrical connection between the plug and the receptacle. Further, the control unit may operate the computing system in a second mode in response determining the absence of the cable-lock unit in the lock port. In an example, the second mode may be a normal mode in which the computing system may work unrestrictedly for any user to access the computing system.

Determining the presence or absence of the cable-lock unit in the lock port of the computing system and operating the computing system in the first mode or the second mode, as described above, depending on the determination of the presence or absence of the cable-lock unit in the lock port, enhances the security and privacy of the computing system and the date therein from an unauthorized user. The computing system can be protected against physical theft, data theft, and unauthorized access simultaneously.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a computing system 100, according to an example. The computing system 100 may include, but is not restricted to, a laptop, a tablet, a mobile phone, a desktop, a docking station, and a printer. As shown in FIG. 1, the computing system 100 includes a lock port 102. The lock port 102 is to receive a cable-lock unit 104 to lock the computing system 100 at a location 106, such as a rigid immovable surface. The cable-lock unit 104 may be a Kensington-type lock. The cable-lock unit 104 has a cable 108 and a hook element 110. The cable 108 at one end is rigidly affixed to the location 106 and at the other end is connected to the hook element 110. The lock port 102 is such that the hook element 110 of the cable-lock unit 104 can be inserted into the lock port 102 to secure the computing system 100 to the location 106.

As shown in FIG. 1, the computing system 100 includes a lock engagement member 112 and a plug 114 coupled to the lock engagement member 112. The lock engagement member 112 may be a movable rod-like element. The lock engagement member 112 is positioned close to an opening of the lock port 102 through which the hook element 110 of the cable-lock unit 104 is inserted. The hook element 110 of the cable-lock unit 104 interacts with the lock engagement member 112 when the hook element 110 is inserted in the lock port 102. The plug 114 may be metallic. In an example, the plug 114 is a metallic pin. The lock engagement member 112 and the plug 114, together, can translate, for example in a direction indicated by arrow A, in response to receiving the cable-lock unit 104, or the hook element 110, in the lock port 102.

Figure 2:
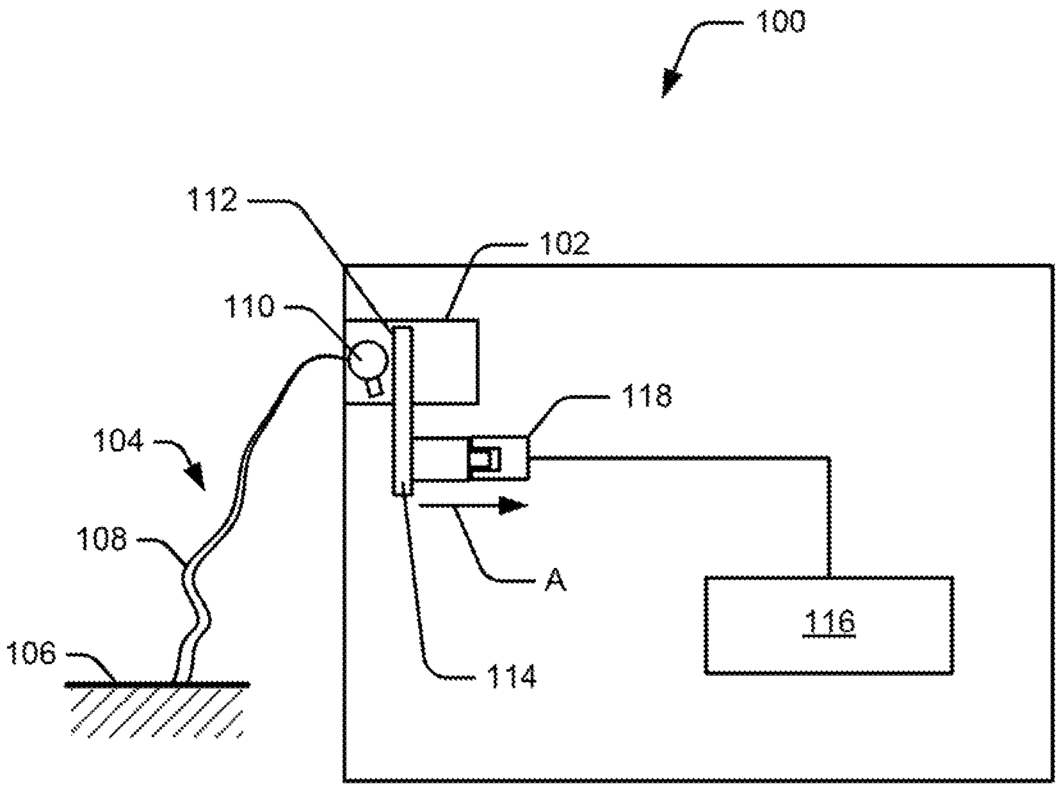
FIG. 2 illustrates the computing system of FIG. 1 with the plug slid into the receptacle, when the cable-lock unit is present in the lock port.

As shown in FIG. 1, the computing system 100 also includes a control unit 116 and a receptacle 118 electrically coupled to the control unit 116. The receptacle 118 may be metallic. In an example, the receptacle 118 may include a metallic slot for receiving the plug 114. As described above, the lock engagement member 112 and the plug 114 translate and form an electrical connection between the plug 114 and the receptacle 118 in response to receiving the cable-lock unit 104 in the lock port 102. The movement of the plug 114 in the direction indicated by arrow A causes the plug 114 to slide into the receptacle 118 to form the electrical connection. FIG. 2 illustrates the computing system 100 of FIG. 1 with the plug 114 slid into the receptacle 118, when the cable-lock unit 104 is present in the lock port 102. In response to formation of the electrical connection between the plug 114 and the receptacle 118, the control unit 116 is to determine presence of the cable-lock unit 104 in the lock port 102. In an example, in response determining the presence of the cable-lock unit 104 in the lock port 102, the control unit 116 may operate the computing system 100 is a secure mode, a demo mode, a guest user mode, or such, in which the computing system 100 may work in a restricted environment which does not allow the user of the computing system 100 access the computing system 100 for an illicit activity or access data.

Figure 3:
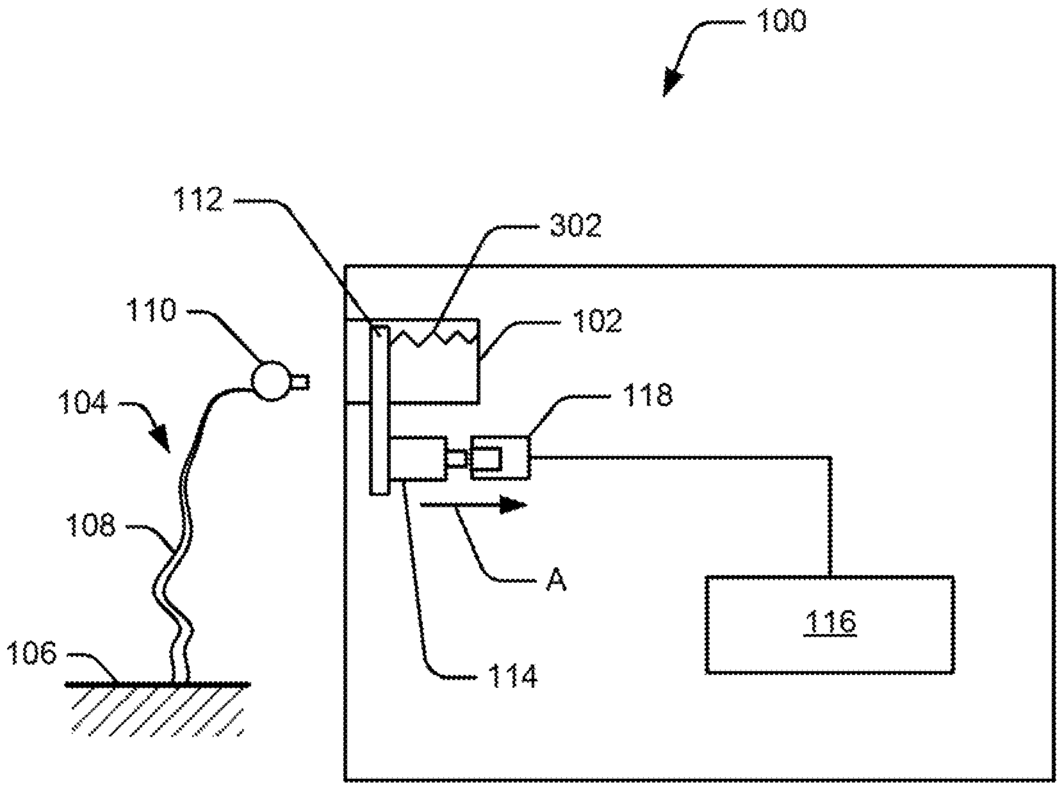
FIG. 3 illustrates the computing system of FIG. 1 with the plug out of the receptacle, when the cable-lock unit is absent in the lock port.

The lock engagement member 112 and the plug 114 are to translate, in a direction opposite to the direction indicated by arrow A, and break the electrical connection between the plug 114 and the receptacle 118 in response to removing the cable-lock unit 104 from the lock port 102. Accordingly, the control unit 116 is to determine absence of the cable-lock unit 104 in the lock port 102 in response to break in the electrical connection between the plug 114 and the receptacle 118. FIG. 3 illustrates the computing system 100 of FIG. 1 with the plug 114 out of the receptacle 118, when the cable-lock unit 104 is removed from the lock port 102. As shown in FIG. 3, the lock engagement member 112 is coupled to a spring member 302. One end of the spring member 302 is coupled to the lock engagement member 112 and the other end of the spring member 302 is coupled to a surface of the lock port 102. Movement of the lock engagement member 112 in the direction indicated by arrow A in response to receiving the cable-lock unit 104 in the lock port 102, compressed the spring member 302. When the cable-lock unit 104 is removed from the lock port 102, the spring member 302 decompresses to move the lock engagement member 112 in the direction opposite to the direction indicated by arrow A and break in the electrical connection between the plug 114 and the receptacle 118.

In an example, the control unit 116 may operate the computing system 100 in a specific mode depending on whether the cable-lock unit 104 is present or absent in the lock port 102 of the computing system 100. The control unit 116 is to operate the computing system 100 in a first mode in response determining the presence of the cable-lock unit 104 in the lock port 102, and the control unit 116 is to operate the computing system 100 in a second mode in response determining the absence of the cable-lock unit 104 in the lock port 102. The first mode may be a secure mode, a demo mode, a guest user mode, or such, as described earlier. In an example, the second mode may be a normal mode in which the computing system 100 may work unrestrictedly for any user accessing the computing system 100.

Further, in an example, the control unit 116 may actively determine the presence or the absence of the cable-lock unit 104 in the lock port 102 of the computing system 100. For active determination, the control unit 116 is to periodically check the electrical connection between the plug 114 and the receptacle 118 to determine the presence of the cable-lock unit 104 in the lock port 102 of the computing system 100. In an example, the control unit 116 may periodically check the electrical connection between the plug 114 and the receptacle 118 after some time period. The time period may be 1 second (sec), or 5 sec, or 10 sec, or so on. In an example, the time period may be defined by a user.

Figure 4:
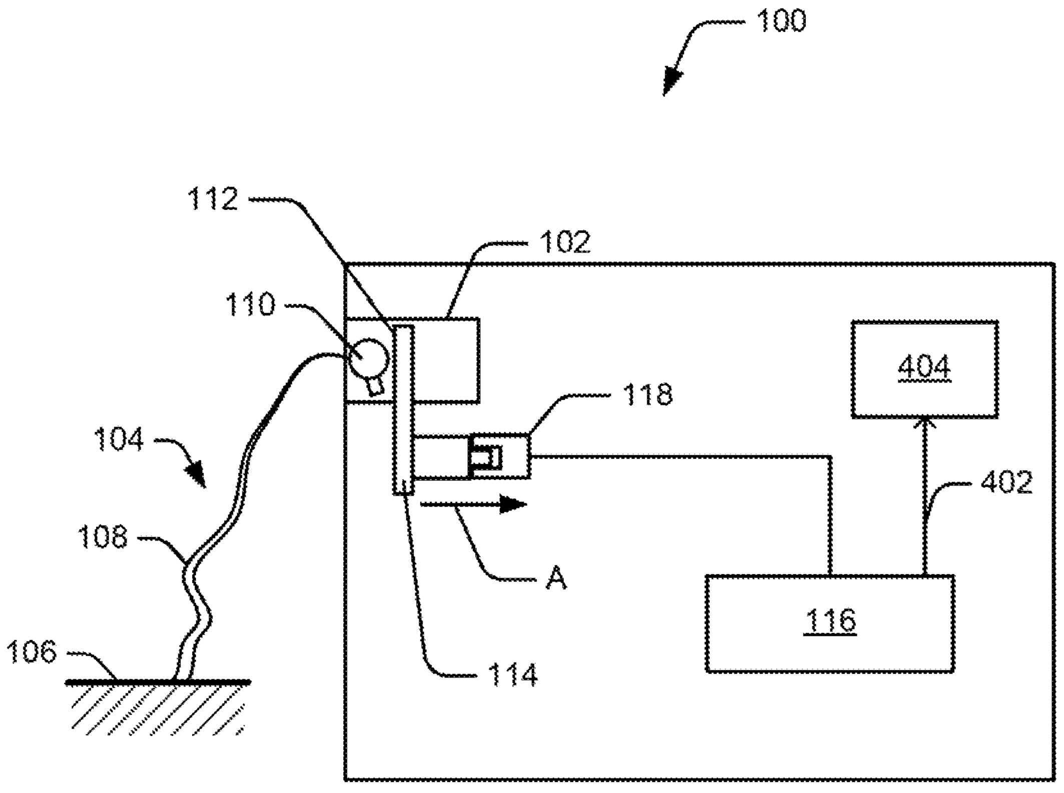
FIG. 4 illustrates the computing system of FIG. 1 with a lock signal to a basic input-output system (BIOS), according to an example.

Further, in an example, the control unit 116 of the computing system 100 is to provide a lock signal to a basic input-output system (BIOS) of the computing system 100 in response determining the presence of the cable-lock unit 104 in the lock port 102, and wherein, in response to receiving the lock signal, the BIOS generates a user password request to boot the computing system 100. FIG. 4 illustrates the computing system 100 of FIG. 1 with a lock signal 402 to a BIOS 404 of the computing system 100, according to an example. The control unit 116 determines the presence of the cable-lock unit 104 in the lock port 102, and in response provides the lock signal 402 to the BIOS 404. The BIOS 404, in response to receiving the lock signal 402 from the control unit 116, generates a user password request to boot the computing system 100. As a result, the user is prompted to enter a user password before the computing system 100 can be booted up. The user password request for booting up the computing system 100 in response to determining the presence of the cable-lock unit 104 in the lock port 102 prevent booting up of the computing system 100 by an unauthorized user.

The control unit 116 may be implemented through a combination of any suitable hardware and computer-readable instructions. The control unit 116 may be implemented in a number of different ways to perform various functions for the purposes of determining presence of a cable-lock unit in a lock port of the computing system 100 and accordingly operating the computing system 100 in a secure manner. For example, the computer-readable instructions for the control unit 116 may be processor-executable instructions stored in a non-transitory computer-readable storage medium, and the hardware for the control unit 116 may include a processing resource to execute such instructions for determining presence of a cable-lock unit in a lock port of the computing system 100 and accordingly operating the computing system 100 in a secure manner. In some examples, the non-transitory computer-readable storage medium may store instructions which, when executed by the processing resource, implement the control unit 116. The processing resource may be implemented as microprocessors, microcomputers, microcontrollers, digital signal processors, central processing units, state machines, logic circuitries, or any devices that manipulate signals based on operational instructions. Among other capabilities, the processing resource may fetch and execute computer-readable instructions stored in a non-transitory computer-readable storage medium. The non-transitory computer-readable storage medium may include, for example, volatile memory (e.g., random-access memory (RAM)), or non-volatile memory (e.g., erasable programmable read-only memory (EPROM), flash memory, non-volatile random-access memory (NVRAM), memristor, etc.). In an example, the control unit 116 may be implemented by electronic circuitry.

Figure 5:
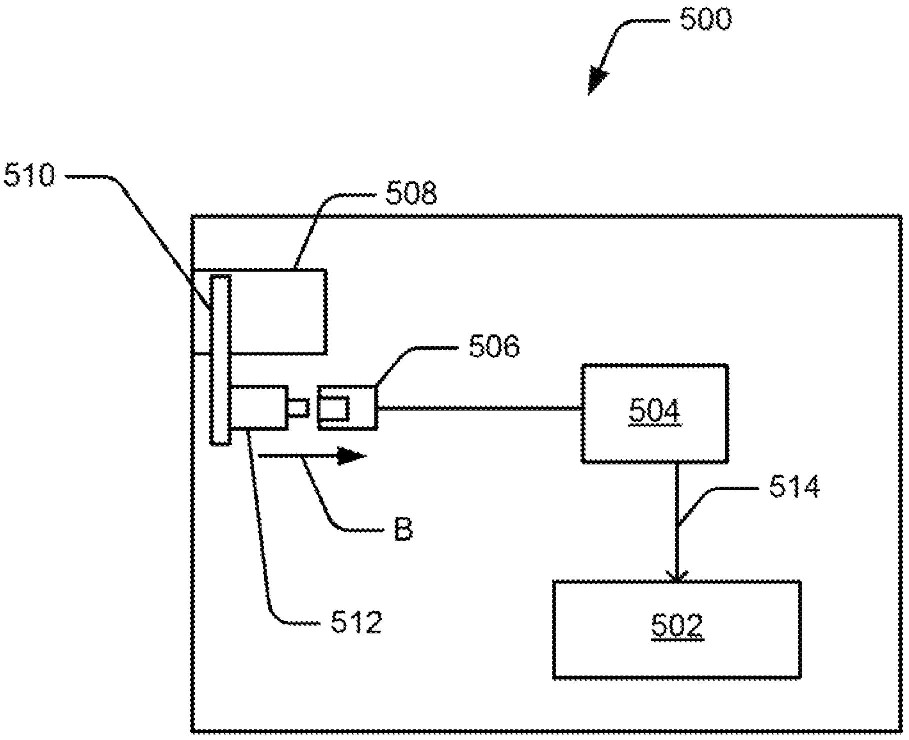
FIG. 5 illustrates a computing system, according to an example.

FIG. 5 illustrates a computing system 500, according to an example. Similar to the computing system 100, the computing system 500 may also include, but is not restricted to, a laptop, a tablet, a mobile phone, a desktop, a docking station, and a printer. As shown, the computing system 500 includes a control unit 502, a jumper circuit unit 504 coupled to the control unit 502, a receptacle 506 electrically coupled to the jumper circuit unit 504, a lock port 508 to receive a cable-lock unit (not shown in FIG. 5) to lock the computing system 500 at a location, a lock engagement member 510, and a plug 512 coupled to the lock engagement member 510. The receptacle 506, the lock port 508, the lock engagement member 510, and the plug 512, of the computing system 500 may be similar to those of the computing system 100.

In an example, in response to receiving the cable-lock unit in the lock port 508, the lock engagement member 510 and the plug 512 translate, for example in a direction indicated by arrow B, and establish an electrical connection between the plug 512 and the receptacle 506. Further, in response to the electrical connection between the plug 512 and the receptacle 506, the jumper circuit unit 504 provides a first signal 514 to the control unit 502. Further, in response to receiving the first signal 514, the control unit 502 determines presence of the cable-lock unit in the lock port 508.

In the computing system 500, the lock engagement member 510 and the plug 512 are to translate, in a direction opposite to the direction indicated by arrow B, and break the electrical connection between the plug 512 and the receptacle 506 in response to removing the cable-lock unit from the lock port 508. In response to break of the electrical connection between the plug 512 and the receptacle 506, the jumper circuit unit 504 is to provide a second signal (not shown in FIG. 5) to the control unit 502. In response to receiving the second signal, the control unit 502 is to determine absence of the cable-lock unit in the lock port 508.

The computing system 500 includes an elastic element (not shown in FIG. 5) coupled to the lock engagement member 510 to retract the lock engagement member 510 and plug 512 and break the electrical connection between the plug 512 and the receptacle 506 when the cable-lock unit is removed from the lock port 508 of the computing system 500. The elastic element may be similar to the spring member 302 shown in FIG. 3. The elastic element is compressed when the cable-lock unit is inserted in the lock port 508. The elastic element is decompressed when the cable-lock unit is removed from the lock port 508.

Further, the control unit 502 is to operate the computing system 500 in a first mode in response determining the presence of the cable-lock unit in the lock port 508, and the control unit 502 is to operate the computing system 500 in a second mode in response determining the absence of the cable-lock unit in the lock port 508. As described earlier, the first mode may be a secure mode, a demo mode, a guest user mode, or such, in which the computing system 500 may work in a restricted environment that does not allow the user of the computing system 500 to access the computing system 500 for an illicit activity or for accessing or stealing data, and the second mode may be a normal mode in which the computing system 500 may work unrestrictedly for any user accessing the computing system 500.

In an example, the jumper circuit unit 504 is to periodically check the electrical connection between the plug 512 and the receptacle 506. In an example, the jumper circuit unit 504 may periodically check the electrical connection between the plug 512 and the receptacle 506 after some time period. The time period may be 1 second (sec), or 5 sec, or 10 sec, or so on. In an example, the time period may be defined by a user. In an example, the control unit 502 is to provide a lock signal to a BIOS (not shown in FIG. 5) of the computing system 500. In response to receiving the lock signal, the BIOS generates a user password request to boot the computing system 500, in a similar manner as described earlier with reference to FIG. 3.

Figure 6:
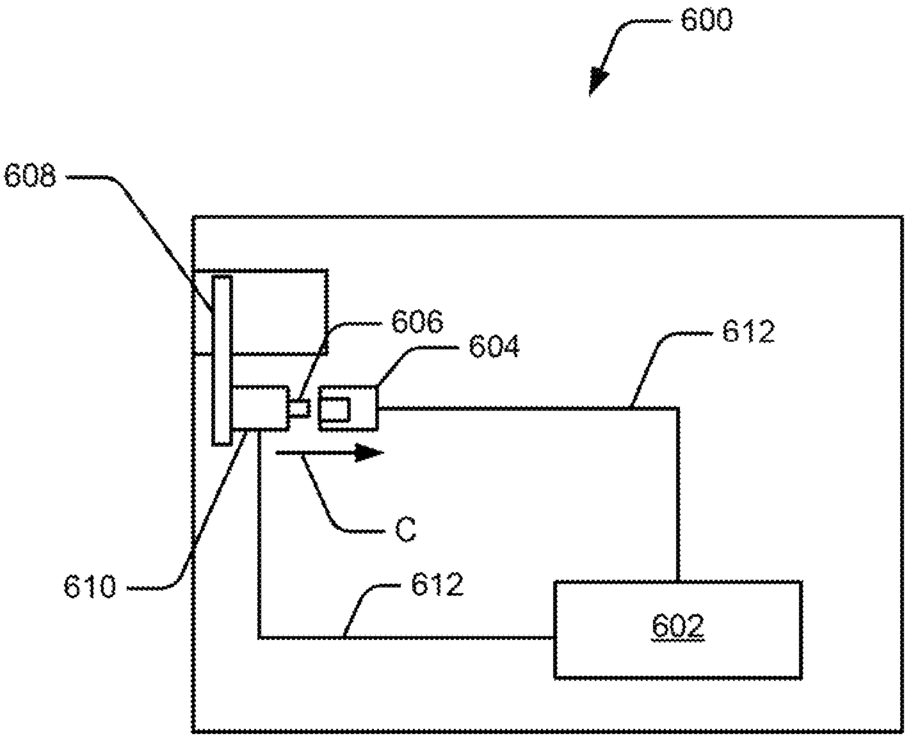
FIG. 6 illustrates a computing system, according to an example.

FIG. 6 illustrates a computing system 600, according to an example. Similar to the computing systems 100 and 500, the computing system 600 may also include, but is not restricted to, a laptop, a tablet, a mobile phone, a desktop, a docking station, and a printer. As shown in FIG. 6, the computing system 600 includes a control unit 602, a receptacle 604 electrically coupled to the control unit 602, a lock port 606 to receive a cable-lock unit (not shown in FIG. 6) to lock the computing system 600 at a location, a lock engagement member 608, and a plug 610 coupled to the lock engagement member 608. The receptacle 604, the lock port 606, the lock engagement member 608, and the plug 610, of the computing system 600 may be similar to those of the computing system 100 or 500.

In the computing system 600, the lock engagement member 608 and the plug 610 are to translate, for example in a direction indicated by arrow C, and establish an electrical connection between the plug 10 and the receptacle 604 in response to receiving the cable-lock unit in the lock port 606 to close an electrical circuit 612 with the control unit 602. Further, in response to closure of the electrical circuit 612, the control unit 602 is to determine presence of the cable-lock unit in the lock port 606 and operate the computing system 600 in a first mode in response. As described earlier, the first mode may be a secure mode, a demo mode, a guest user mode, or such, in which the computing system 600 may work in a restricted environment that does not allow the user of the computing system 600 to access the computing system 600 for an illicit activity or for accessing or stealing data.

Further, the lock engagement member 608 and the plug 610 are to translate, in a direction opposite to the direction indicated by arrow C, and break the electrical connection between the plug 610 and the receptacle 604 in response to removing the cable-lock unit from the lock port 606 to open the electrical circuit 612 with the control unit 602. The control unit 602 is to determine absence of the cable-lock unit in the lock port 606 and operate the computing system 600 in a second mode, when the electrical circuit 612 is open. As described earlier, the second mode may be a normal mode in which the computing system 600 may work unrestrictedly for any user accessing the computing system 600.

Although examples for the present disclosure have been described in language specific to structural features, it is to be understood that the appended claims are not limited to the specific features described herein. Rather, the specific features are disclosed and explained as examples of the present disclosure.

We claim:

1. A computing system comprising:

a control unit;

an internal receptacle electrically coupled to the control unit;

a lock port to receive a cable-lock unit to lock the computing system at a location;

a lock engagement member movable by the cable-lock unit when the cable-lock unit is received in the lock port; and a plug coupled to the lock engagement member and movable with the lock engagement member, wherein the lock engagement member and the plug are to translate in response to receiving the cable-lock unit in the lock port, wherein such translation causes the plug to engage the receptacle to complete a circuit between the plug and the receptacle, the control unit is to determine presence of the cable-lock unit in the lock port in response to completion of the circuit between the plug and the receptacle, and the control unit is to provide a lock signal to a basic input-output system (BIOS) of the computing system in response to determining the presence of the cable-lock unit in the lock port, and, in response to receiving the lock signal, the BIOS generates a user password request to boot the computing system.

2. The computing system as claimed in claim 1, wherein the lock engagement member and the plug are to translate and break the circuit between the plug and the receptacle in response to removing the cable-lock unit from the lock port, and wherein the control unit is to determine absence of the cable-lock unit in the lock port in response to breaking the circuit between the plug and the receptacle.

3. The computing system as claimed in claim 2, wherein the control unit is to operate the computing system in a first mode in response determining the presence of the cable-lock unit in the lock port, and wherein the control unit is to operate the computing system in a second mode in response determining the absence of the cable-lock unit in the lock port.

4. The computing system as claimed in claim 1, wherein the control unit is to periodically check the circuit between the plug and the receptacle to determine the presence of the cable-lock unit in the lock port.

5. The computing system as claimed in claim 1, wherein the control unit is to operate the computing system in a secure mode in response determining the presence of the cable-lock unit in the lock port.

6. A computing system comprising:

a control unit;

an internal receptacle electrically coupled to the control unit;

a lock port to receive a cable-lock unit to lock the computing system at a location;

a lock engagement member movable by the cable-lock unit when the cable-lock unit is received in the lock port; and a plug coupled to the lock engagement member and movable with the lock engagement member, wherein the lock engagement member and the plug are to translate in response to receiving the cable-lock unit in the lock port, wherein such translation causes the plug to engage the receptacle to complete a circuit between the plug and the receptacle, the control unit is to determine presence of the cable-lock unit in the lock port in response to completion of the circuit between the plug and the receptacle, and the control unit is to operate the computing system in a demo mode in response determining the presence of the cable-lock unit in the lock port.

7. A computing system comprising:

a control unit;

a jumper circuit unit coupled to the control unit;

an internal receptacle electrically coupled to the jumper circuit unit;

a lock port to receive a cable-lock unit to lock the computing system at a location;

a lock engagement member movable by the cable-lock unit when the cable-lock unit is received in the lock port; and a plug coupled to the lock engagement member and movable with the lock engagement member, wherein in response to receiving the cable-lock unit in the lock port, the lock engagement member and the plug are to translate to cause the plug engage the receptacle to complete a circuit between the plug and the receptacle, in response to completion of the circuit between the plug and the receptacle, the jumper circuit unit is to provide a first signal to the control unit, in response to receiving the first signal, the control unit is to determine presence of the cable-lock unit in the lock port, and the control unit is to provide a lock signal to a basic input-output system (BIOS) of the computing system, and, in response to receiving the lock signal, the BIOS generates a user password request to boot the computing system.

8. The computing system as claimed in claim 7, wherein the lock engagement member and the plug are to translate and break the circuit between the plug and the receptacle in response to removing the cable-lock unit from the lock port, in response to breaking the circuit between the plug and the receptacle, the jumper circuit unit is to provide a second signal to the control unit and in response to receiving the second signal, the control unit is to determine absence of the cable-lock unit in the lock port.

9. The computing system as claimed in claim 8, further comprising an elastic element coupled to the lock engagement member to retract the lock engagement member and plug and break the circuit between the plug and the receptacle.

10. The computing system as claimed in claim 8, wherein the control unit is to operate the computing system in a first mode in response determining the presence of the cable-lock unit in the lock port, and wherein the control unit is to operate the computing system in a second mode in response determining the absence of the cable-lock unit in the lock port.

11. The computing system as claimed in claim 7, wherein the jumper circuit unit is to periodically check the circuit between the plug and the receptacle.

12. The computing system as claimed in claim 6, wherein the lock engagement member and the plug are to translate and break the circuit between the plug and the receptacle in response to removing the cable-lock unit from the lock port to open the electrical circuit with the control unit, and the control unit is to determine absence of the cable-lock unit in the lock port and operate the computing system in a second mode, when the electrical circuit is open.

13. The computing system as claimed in claim 6, further comprising a spring member coupled to the lock engagement member, wherein the spring member decompresses to urge the lock engagement member in a direction that causes the electrical circuit between the plug and the receptacle to break in response to removing the cable-lock unit from the lock port.

14. The computing system as claimed in claim 6, wherein the lock engagement member and the plug are to translate to complete the circuit between the plug and the receptacle by causing the plug to slide into the receptacle.

15. The computing system as claimed in claim 1, wherein the lock engagement member is positioned near an opening of the lock port to interact with the cable-lock unit when the cable-lock unit is inserted into the lock port.

16. The computing system as claimed in claim 1, wherein the lock engagement member is a movable rod.

17. The computing system as claimed in claim 1, wherein the lock engagement member and the plug are to translate to complete the circuit between the plug and the receptacle by causing the plug to slide into the receptacle.

18. The computing system as claimed in claim 6, wherein the control unit is to provide a lock signal to a basic input-output system (BIOS) of the computing system in response determining the presence of the cable-lock unit in the lock port, and wherein, in response to receiving the lock signal, the BIOS generates a user password request to boot the computing system.

* * * * *